(12) United States Patent
Black

(10) Patent No.: US 7,631,439 B2
(45) Date of Patent: Dec. 15, 2009

(54) REFERENCE CHART APPARATUS

(76) Inventor: Bryan Joseph Black, 6246 E. Quartz Ln., Anaheim, CA (US) 92807

(*) Notice: Subject to any disclaimer, the term of this patent is extended or adjusted under 35 U.S.C. 154(b) by 43 days.

(21) Appl. No.: 12/150,504

(22) Filed: Apr. 28, 2008

(65) Prior Publication Data

US 2009/0265951 A1  Oct. 29, 2009

(51) Int. Cl.
*G06G 1/00* (2006.01)

(52) U.S. Cl. .................. 33/759; 33/1 SB; 33/679.1

(58) Field of Classification Search .......... 33/1 C, 33/1 B, 1 SB, 494, 755, 759, 760, 679.1
See application file for complete search history.

(56) References Cited

U.S. PATENT DOCUMENTS

| | | | |
|---|---|---|---|
| 2,240,753 A | | 5/1941 | Bouchard et al. |
| 2,716,286 A | * | 8/1955 | Penna .................. 33/755 |
| 3,885,314 A | | 5/1975 | Banas, Sr. |
| 4,325,278 A | | 4/1982 | Beerens |
| 4,506,446 A | | 3/1985 | Mitchell |
| 5,555,628 A | * | 9/1996 | Madden .................. 33/1 SB |
| 5,845,410 A | | 12/1998 | Boker |
| 5,896,673 A | * | 4/1999 | Kustor .................. 33/679.1 |
| 6,453,572 B2 | * | 9/2002 | Cross et al. .............. 33/1 SB |
| 6,684,519 B1 | | 2/2004 | McAllisterr |
| 6,918,191 B2 | | 7/2005 | Stauffer et al. |
| 7,431,212 B2 | * | 10/2008 | Kaner .................. 33/755 |
| 2003/0094082 A1 | | 5/2003 | Meged |
| 2005/0098009 A1 | | 5/2005 | Berthiaume |
| 2005/0166417 A1 | * | 8/2005 | Clapper .................. 33/759 |
| 2008/0261184 A1 | * | 10/2008 | Eras et al. .................. 33/494 |
| 2009/0049703 A1 | * | 2/2009 | Leonard .................. 33/759 |

* cited by examiner

*Primary Examiner*—G. Bradley Bennett
(74) *Attorney, Agent, or Firm*—Gene Scott; Patent Law & Venture Group

(57) ABSTRACT

A reference chart apparatus for determining cutting angles of molding strips provides a tape housing containing a pair of tape coils. The top and bottom surfaces of the tape coils are imprinted with cutting guide charts providing miter angle and blade tilt cutting data for corner angles between zero and at least 180°. In addition, the housing defines three angled cutouts measuring 52°, 45°, and 38° respectively, for determining the slope angle of a given piece of molding. Each one of the cutouts is preferably colored with a unique reference color corresponding to an appropriate cutting guide chart sharing the same reference color. A housing clamp is also provided for removably engaging the housing, allowing the housing to be stored and used in a readily accessible area, such as on a miter saw.

13 Claims, 5 Drawing Sheets

FIG. 5A

| A | M | B |
|---|---|---|
| 0 | 90.0 | 52.0 |
| 1 | 89.2 | 52.0 |
| 2 | 88.4 | 52.0 |
| 3 | 87.6 | 52.0 |
| 4 | 86.8 | 52.0 |
| 5 | 85.9 | 51.9 |
| 6 | 85.1 | 51.9 |
| 7 | 84.3 | 51.9 |
| 8 | 83.5 | 51.8 |
| 9 | 82.7 | 51.8 |

FIG. 5B

| A | M | B |
|---|---|---|
| 0 | 90.0 | 45.0 |
| 1 | 89.3 | 45.0 |
| 2 | 88.6 | 45.0 |
| 3 | 87.9 | 45.0 |
| 4 | 87.2 | 45.0 |
| 5 | 86.5 | 44.9 |
| 6 | 85.8 | 44.9 |
| 7 | 85.1 | 44.9 |
| 8 | 84.4 | 44.9 |
| 9 | 83.6 | 44.8 |

FIG. 6A

| A | M | B |
|---|---|---|
| 0 | 90.0 | 38.0 |
| 1 | 89.4 | 38.0 |
| 2 | 88.7 | 38.0 |
| 3 | 88.1 | 38.0 |
| 4 | 87.5 | 38.0 |
| 5 | 86.8 | 38.0 |
| 6 | 86.2 | 37.9 |
| 7 | 85.6 | 37.9 |
| 8 | 84.9 | 37.9 |
| 9 | 84.3 | 37.9 |

FIG. 6B

| A | M |
|---|---|
| 0 or 360 | 90.0 |
| 1 or 359 | 89.5 |
| 2 or 358 | 89.0 |
| 3 or 357 | 88.5 |
| 4 or 356 | 88.0 |
| 5 or 355 | 87.5 |
| 6 or 354 | 87.0 |
| 7 or 353 | 86.5 |
| 8 or 352 | 86.0 |
| 9 or 351 | 85.5 |

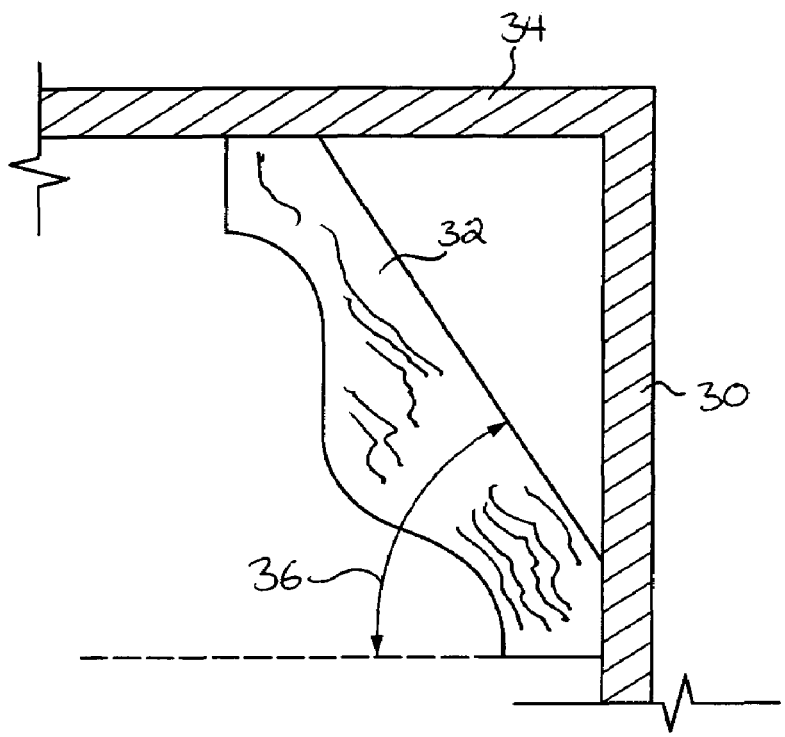
FIG. 7
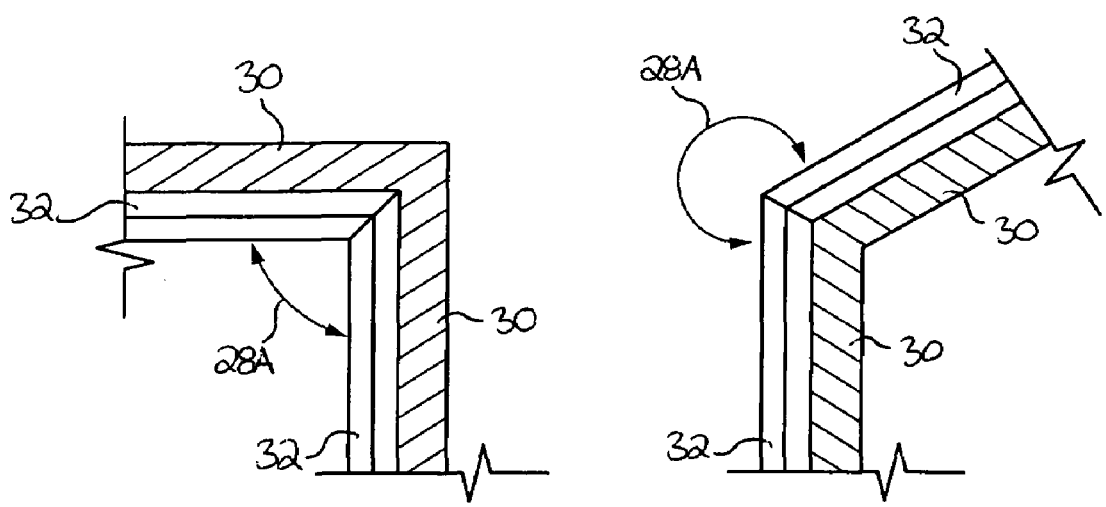
FIG. 8A  FIG. 8B

REFERENCE CHART APPARATUS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to reference materials such as charts and tables, and more particularly to devices for looking-up conversions, facts and information. The present invention may be used generally for such applications but is particularly applicable to the cutting of moldings in finished cabinetry and in finish carpentry outside, and especially inside buildings.

2. Description of Related Art Including Information Disclosed Under 37 CFR 1.97 and 1.98

Meged, US 2003/0094082, discloses a device for obtaining miter saw settings for cutting material to miter together wherein the settings may be obtained without measuring the angle of the surface material. The device comprises a frame having a setting scale and first and second pivotally attached arms, wherein the setting scale corresponds to the settings on a miter saw.

Berthiaume, US 2005/0098009, discloses a cutting guide allowing for positioning of a piece according to its final installation orientation, relative to the blade of a cutting tool, said tool being provided with a working table having a substantially horizontal plane, a guide having a substantially vertical plane and means for angularly positioning the blade relative to the guide, the plane of the working table and the plane of the guide forming orthogonal planes, the piece being of the type comprising a longitudinal axis, a rear portion substantially parallel to the axis and an inferior portion substantially parallel to the axis; the cutting guide comprising a longitudinal axis and opposed ends; first means cooperating with the plane of the working table and the plane of the guide for maintaining the longitudinal axis of the cutting guide substantially parallel to the orthogonal planes; and second means comprising a first plane parallel and adjacent to the plane of the working table or coplanar with that of the working table, and a second plane forming a predetermined angle inferior to 90 degrees relative to a first plane for receiving and orienting at least part of a rear portion of the piece according to a predetermined inclined plane, when the piece is maintained against the first and second planes for positioning in a stable manner the piece substantially according to its final installation orientation, and for positioning the longitudinal axis of the piece substantially parallel to that of the cutting guide; said piece being adapted to be manually maintained against the first and second planes and the cutting guide being adapted to be positioned relative to the cutting trajectory of the blade so that the piece is cut at a desired angle and at a desired length adjacent one of the ends of the cutting guide. Preferably, the piece is a crown molding or an analogous molding. The invention also relates to a method of using the cutting guide.

Bouchard et al., U.S. Pat. No. 2,240,753, discloses a measuring device having a casing, a pair of complementary rules mounted in spaced relation in the casings and adapted to assume coiled arrangement therein, and means connecting the said rules whereby extension of one rule will cause corresponding extension of the other.

Banas, Sr., U.S. Pat. No. 3,885,314, discloses a two-way measuring and centering device including first and second tape measures extensible in opposite directions. The tape measures are located in separate compartments of a single housing. An inscribing device projects through the housing between the first and second tape measures. The inscribing device includes an elongate shaft having a flat end adapted to be struck with a hammer or otherwise depressed and an opposite pointed end for inscribing a mark when the shaft is struck. Spring bias means are provided for maintaining the shaft in a raised position with the tip enclosed in the housing until the shaft is depressed.

Beerens, U.S. Pat. No. 4,325,278, discloses a hand saw guide comprising a member having two right angled related surfaces so that where one surface is in face to face contact with a component to be sawn the other surface is perpendicular to the component. The other surface having incorporated therein a magnet that creates a magnetic field to hold the blade of a saw against said other surface. The saw can thus be operated to cut the component while held in guided relationship with the other surface.

Mitchell, U.S. Pat. No. 4,506,446, discloses a tape measure device having two mutually exclusively operable tape measures mounted in a housing such that each tape is adapted to extend linearly from opposite ends of the housing. Each tape measure is adapted to engage a series of gears which, when engaged, turn a counter to total the distance to which the tapes are linearly extended from the housing. Only one of the two tapes may be engaged at one time. Upon the extension of either of the two tapes, the counter is actuated to register the total distance between the ends of the tapes.

Boker, U.S. Pat. No. 5,845,410, discloses a multiple position, miter device or gauge for use with a table saw or the like which includes a protractor having a plurality of equally spaced precision drilled step-holes, a sine bar, a micrometer adjust, and a guide bar adapted to fit within a guide groove or miter slot.

McAllisterr, U.S. Pat. No. 6,684,519, discloses a miter saw table that has adjustable measuring tapes. The tape sections can be calibrated so that the zero point on the tape is always set at the outer surface of the blade. This is done by using slidable wings that can be secured to a base. The wings are readjusted until the built-in tapes match a control tape. Once the wings are set, cuts can be made quickly by either setting a stop at the precise distance needed, or by sliding the board under the blade until the end of the board aligns with the desired measurement. The board can then be accurately cut without having to measure and mark the board first. Moreover, if the blade is changed during the course of work. The measuring system can be quickly re-calibrated to the thickness of the new blade and cuts can immediately be resumed.

Stauffer et al., U.S. Pat. No. 6,918,191, discloses a linear measuring device including a tape housing and a semi-flexible measuring tape housed within the tape housing in a generally spiral configuration with an outer end extendable through a tape outlet opening. An extendable generally flat rear tail is movably mounted on the tape housing generally opposite the tape outlet opening and a generally flat forward tongue is mounted on and extends forwards from the outer end of the measuring tape. Finally, two sets of measurements are displayed on the measuring tape, the outer measurement set displaying the total extended distance of the measuring tape from the outer end to the tape outlet opening and the inner measurement set displaying the total distance from the outer end of the rear tail to the outer end of the forward tongue such that outer and inner measurements are simultaneously displayed on the measuring tape.

The related art described above discloses miter saw gauges and measuring devices, as well as measuring devices having a pair of measuring tape coils. However, the prior art fails to disclose a coiled tape device containing reference charts on its surfaces, and in particular does not disclose such a device that has multiple tape surface which, together, contain all the reference information needed to cut abutting edges of crown molding of all the three types made in the United States for any wall angle. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

Moldings (USA) or mouldings (AUS, CAN, UK) are strips of material used to cover transitions between surfaces or for decoration. They are traditionally made from solid milled wood or plaster but may be made from plastic or reformed wood. In classical architecture and sculpture, the molding is often carved in marble or other stone. A "sprung" molding is a strip that has beveled edges, allowing it to be mounted at an angle between two non-parallel planes, such as between a wall and a ceiling. Other types of molding are referred to as "plain". Molding, such as crown molding, is designed to gracefully flare out to a finished top edge of a piece of furniture or other structure. Generally, crown molding is used for capping walls, cabinets, door and window hoods, and, most commonly, for decoratively concealing the joining seam between a ceiling and a wall. Usually crown molding is not placed flush against the wall nor against the ceiling; but instead, forms a triangle with the ceiling and the wall, when viewed from the molding's end. This adds a degree of difficulty to the installation process; namely the need for complex cuts to form corners where two walls meet. The calculation of these angled cuts is affected by the angle that the plane of the molding makes with the wall and ceiling (known as the "crown slope angle"). Typically, crown molding material is sold with either a 52°, 45°, or 38° crown slope angle. Thus, correct crown slope angle and wall corner angle determinations must be made before attempting to cut the molding. The calculations involved in these determinations can be complex, and even the slightest mistake using traditional crown molding measurement tools, i.e., miter guages, protractors, sine bars, for instance, can affect the final appearance of an installation.

One attempted solution to this problem is to provide software that performs the necessary calculations. However, software requires a computer to execute it, and computers are not always readily available at a job site. Another attempted solution is to provide a printed table of pre-calculated measurements for every possible corner angle and crown slope angle. However, printed materials are not highly compatible with a work site and with work routines that produce quantities of dust and dirt, that treat all items in the near vicinity of work sites roughly and that are easily misplaced, borrowed, lost, etc. Also, charts and tables are subject to being misread or misinterpreted. Thus, there has been a long-felt need in this field for a means that is compact, portable, and enables quick and accurate determinations of cutting angles for molding.

The present invention solves these problems, and provides significant advantages over the related art, by teaching a reference chart apparatus for determining cutting angles of molding sections to be severed from molding stock strips. This apparatus uses a tape very much like a measuring tape used by contractors. The tape in the present invention has printed on it the information that an interior carpenter needs in order to cut molding strips with correct angles. Three of the cutting guide charts that are printed on one or more of the tapes that may be pulled out of a typical tape housing relate to the common molding slope angles of 52°, 45° and 38°, while a further cutting guide chart relates to flat mounted molding strips. Thus, the present invention provides comprehensive reference data for cutting molding.

In addition, the housing provides three angled cutouts measuring 52°, 45°, and 38° respectively, enabling a user to position a piece of molding in the cutouts, in turn, to quickly and easily determine the slope angle of the molding, without having to perform any actual time-consuming measurements or calculations. In addition, each one of the cutouts is preferably colored with a unique reference color corresponding to an appropriate cutting guide chart sharing the same reference color. Thus, the user is not even required to remember the actual slope angle of the molding they are working with; but rather simply a color. This ensures that the user will not reference the wrong cutting guide chart, and allows for quick, easy, and accurate cutting measurements.

A housing clamp is also provided for removable engagement with the housing, thereby allowing the housing to be stored and used in a readily accessible area, such as on a miter saw. The housing clamp has a generally planar rear surface configured for being secured to a mounting surface, as well as a plurality of resilient fingers positioned and configured for removably accepting the housing between the fingers in a compressive engagement, thereby permitting unobstructed use of the housing without risk of unintentional disengagement of the housing from the clamp.

A primary objective inherent in the above described apparatus and method of use is to provide advantages not taught by the prior art.

Another objective is to provide a reference chart apparatus for determining cutting angles for molding that is compact and relatively easy to use.

A further objective is to provide such an apparatus that provides angled cutouts measuring 52°, 45°, and 38° respectively to ensure accurate measuring of a molding slope angle.

A still further objective is to provide such an apparatus that is color-coded to ensure accurate referencing of the charts.

A still further objective is to provide such an apparatus that is capable of being removably secured to a surface such as a miter saw.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIGS. 5A, 5B, 6A, and 6B are partial plan views of a top or bottom surface of a linear portion of each of the tape coils, illustrating exemplary cutting guide charts imprinted thereon;

FIG. 7 is a cross-sectional elevational view of a crown molding strip mounted so as to bridge between a wall surface and a ceiling surface; and FIG. 8A is a cross-sectional plan view of crown molding strips mounted across the interior angle of an intersection between walls; and FIG. 8B is a cross-sectional plan view of crown molding strips mounted across the exterior angle of an intersection between the walls.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
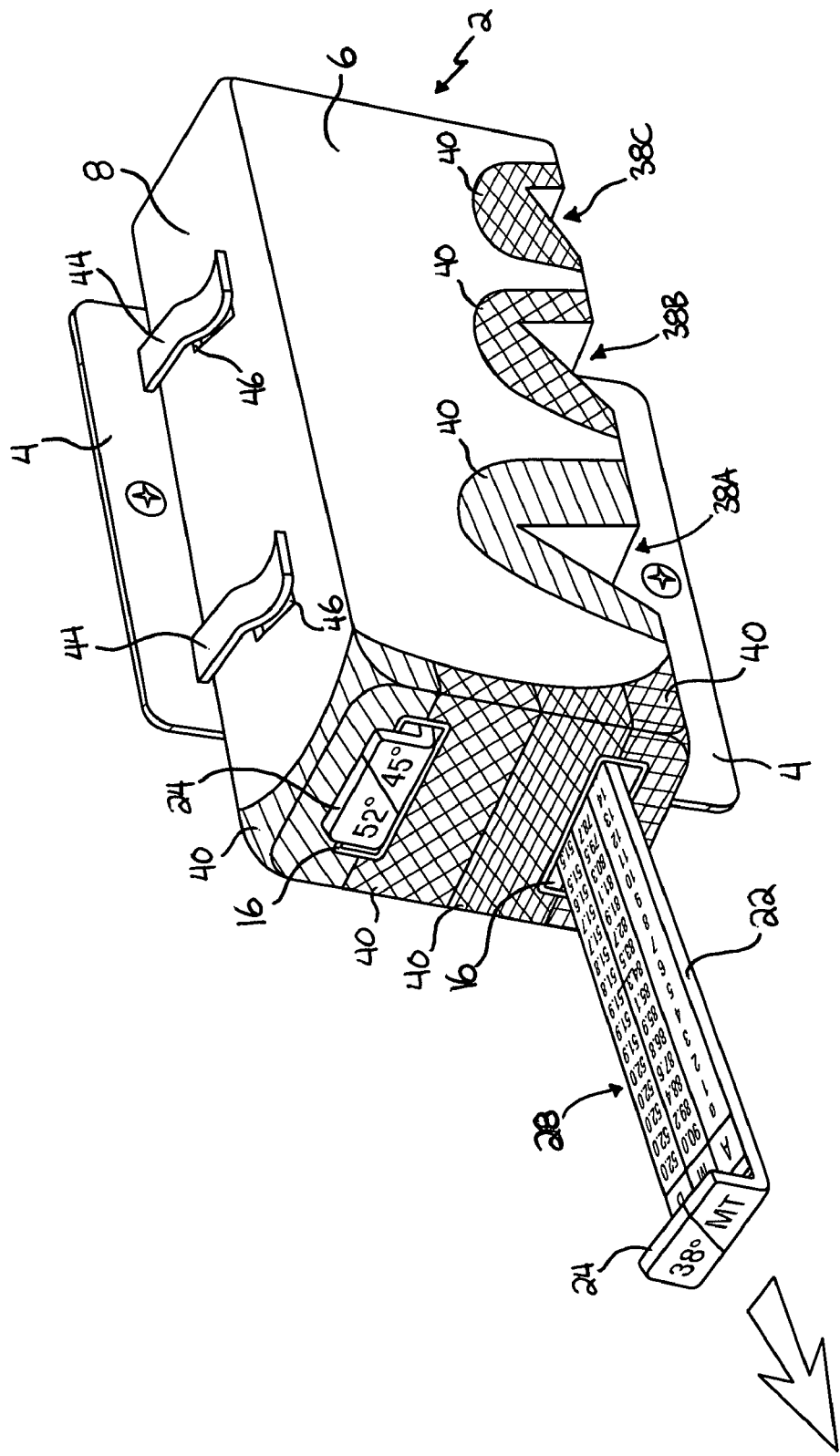
FIG. 1 is a perspective view of the presently described apparatus, a coiled tape housing mounted on a spring clamp.
Figure 2:
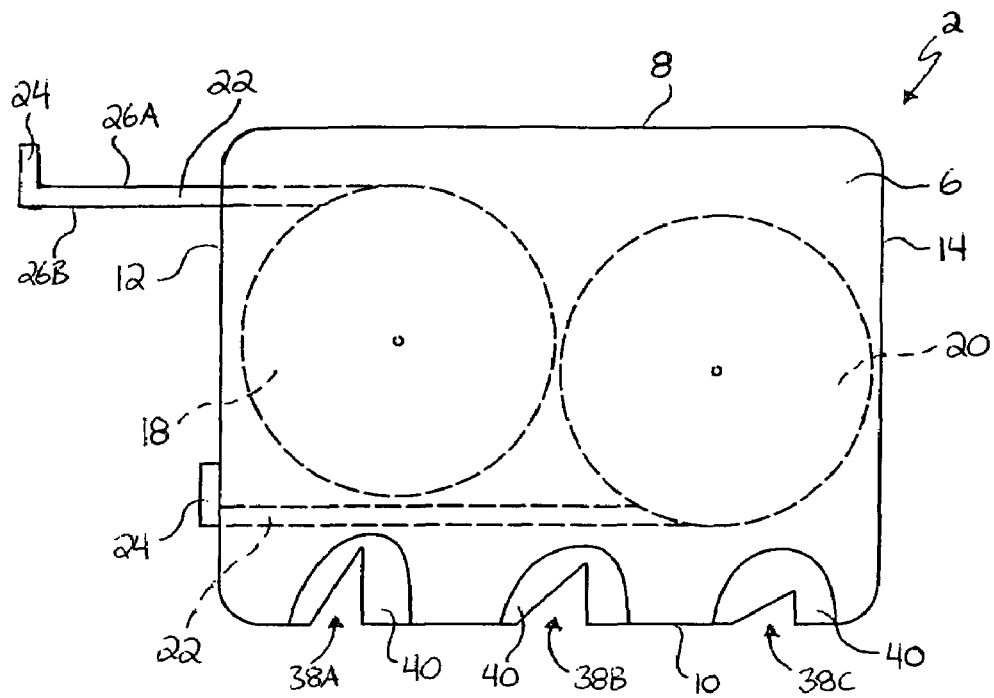
FIG. 2 is a side elevational view of the tape housing thereof showing the manner in which any one of plural coiled tapes may be uncoiled and extended from the housing.
Figure 3:
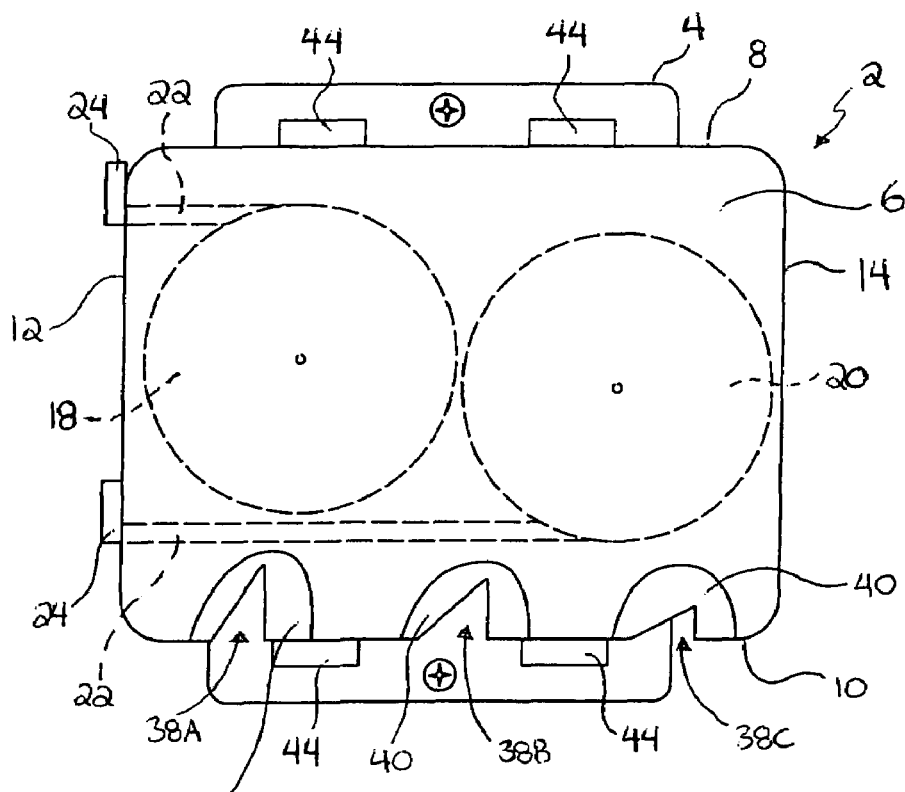
FIG. 3 is similar to FIG. 2, further including the spring clamp.

Described now in detail is a reference chart apparatus including a tape housing 2 holding therein, one or more tape coils 18, 20 as shown in FIGS. 1-3. The tape coils are selectively extendable from the tape housing 2 and thereafter retractable into the tape housing 2. A tape surface references by 26A and 26B of the tape coil 18 or 20 is imprinted with a reference chart 28 having one or more columns of input data items, and, in side-by-side relationship with the column or columns of input data items, one or more columns of output data items; the input and output data items related as a system of reference information which means that one may enter the chart 28 at any of its input data items and find one or more related output data items. For instance, in such a system of reference information, an input column may contain angles between abutting walls. For instance, most walls in a rectangular room meet at a 90° angle. However, such angles typically range from 85° to 95°. When cutting crown molding length, such deviations from a nominal value are critical. In such a chart the output data items are the miter angle and the blade tilt angle, and these would be included in two output columns in the chart.

Crown molding is generally installed at the intersection of a wall and a ceiling, but may also be installed below the ceiling so as to support hidden up-cast lighting, or on furniture and other applications. As best shown in FIGS. 1-3, tape housing 2 is peferably a hollow structure comprising a pair of opposing side walls 6, a top wall 8, a bottom wall 10, and a pair of opposing first and second end walls 12 and 14. As shown in FIG. 1, the tape housing 2 provides a pair of housing apertures 16 within the first end wall 12. In an alternate embodiment (not shown), one of the housing apertures 16 may be positioned in each of the end walls 12 and 14.

As shown with hidden lines in FIGS. 2 and 3, a pair of first and second tape coils 18 and 20 are mounted within the tape housing 2. Of course, only one, or more than two such tape coils may be used depending on the proposed application. The structure of these tape coils 18, 20, and their mounting and operation is well known in common tape ruler construction and operation. As exemplified in FIG. 1, a linear portion 22 of either of the tape coils 18 and 20 may be drawn out of the housing 2 through one of the housing apertures 16, and preferably a resisting spring, not shown, is employed, as with a common measuring tape ruler, to withdraw the linear portion 22 back into the housing when it is no longer needed. An end of each of the tape coils 18 and 20 provides a terminal lip 24, which stops the retracting action when the section 22 is fully recoiled.

A top tape surface 26A and a bottom tape surface 26B of each one of the tape coils 18 and 20 is imprinted with a column of input data items and at least one further column of output data items. Such references charts are well known in the art and are used regularly, as for instance when finding a date on a calendar to determine the day of the week, or when using a conversion chart as for currency conversions. Reference chart 28. "cutting guide chart" is used as a generic term, however, each of the charts in the present invention are different from one another. Shown in exemplary detail in FIGS. 5A, 5B, 6A, and 6B, are portions of each one of an exemplary series of cutting guide reference charts 28 showing the columnar form, laid out longitudinally on the surfaces of the tape coils 18. Three of the cutting guide charts 28 (FIGS. 5A, 5B, and 6A) have three columns labeled "A," "M," and "B." The letter "A" stands for the angle between walls which is represented by angle 28A in FIGS. 8A and 8B. The letter "M" stands for the miter angle 28M which is the angle representing the divergence from a right angular cut and which is equal in magnitude to one-half of the miter angle 28A. The letter "B" stands for tilt angle 28B of the cutting blade. Tilt angle 28B is necessary since crown molding is set at an angle 36 (FIG. 7), so that without cutting with a tilt angle 28B, molding strips would not abut along their entire length when they are brought together at a corner. A miter saw is able to adjust for desired miter angles 28M as well as tilt angles 28B so as to assure full abutment between sections of crown molding at wall corners. Angles 28A are shown in FIG. 8A for inside angles, and in FIG. 8B for outside angles. Angle 28A generally lies between about 45° and 315° as shown in the figures, but in rare instances, it may vary from this range.

Each one of the three cutting guide charts 28 shown in FIGS. 5A, 5B, and 6A, relate to crown molding slope angles 36, i.e., the angle that the molding 32 forms with respect to the wall 30 and ceiling 34. Common slope angles are 52° (FIG. 5A), 45° (FIG. 5B) as manufactured in the United States. The fourth cutting guide chart 28 (FIG. 6B) has columns presenting data only for miter angles 28M for corner angles 28A between zero and at least 180° for installing molding 32 flat against a surface, for example, when installing baseboard, wainscoting, chair rail and other moldings. The cutting guide charts 28 preferably present data for corner angles 28A between zero and 360° in order to accommodate both interior corner angles 28A (FIG. 8A) and exterior corner angles 28A (FIG. 8B). Thus, the present invention provides comprehensive reference data for cutting molding 32.

Referring now to FIGS. 2 and 3 showing the housing 2, the bottom wall 10 and side walls 6 of the housing 2 define three angled exterior surfaces 38A, 38B, and 38C measuring 52°, 45°, and 38° respectively. Thus, a user is able to position a piece of molding 32 against these angled exterior surfaces 38A, 38B, and 38C in order to quickly determine its slope angle 36, without having to perform time-consuming measurements or calculations. Once the slope angle 36 of a molding is determined, one may consult the appropriate tape coil 18 or 20 for a cutting guide reference chart 28 corresponding to the known slope angle 36 and obtain needed saw blade angles. In order to eliminate errors in this chart look-up process, each one of the angled exterior surfaces 38A, 38B, and 38C is preferably colored or otherwise rendered visually distinct with a surface marking such as a shading or a cross-hatching 40. In addition, the corresponding lips 24 and cutting guide chart 28, are similarly marked. The first end 12 of the housing 2 is also similarly marked, as shown in FIG. 1. Thus, one need not remember the slope angle 36 of the molding 32 that is being installed, but merely only its reference color or other visually distinct marking, which ensures that the user will not reference the wrong cutting guide chart 28. Thus, for example, if the molding's slope angle 36 matches the 52° cutout 38A, which has, for example, a red reference color 40, the user simply accesses the tape coil with the corresponding cutting guide chart 28, which would also have a red reference color 40. It should be noted that the reference colors 40, or other visual distinctiveness may be selected at random.

Figure 4:
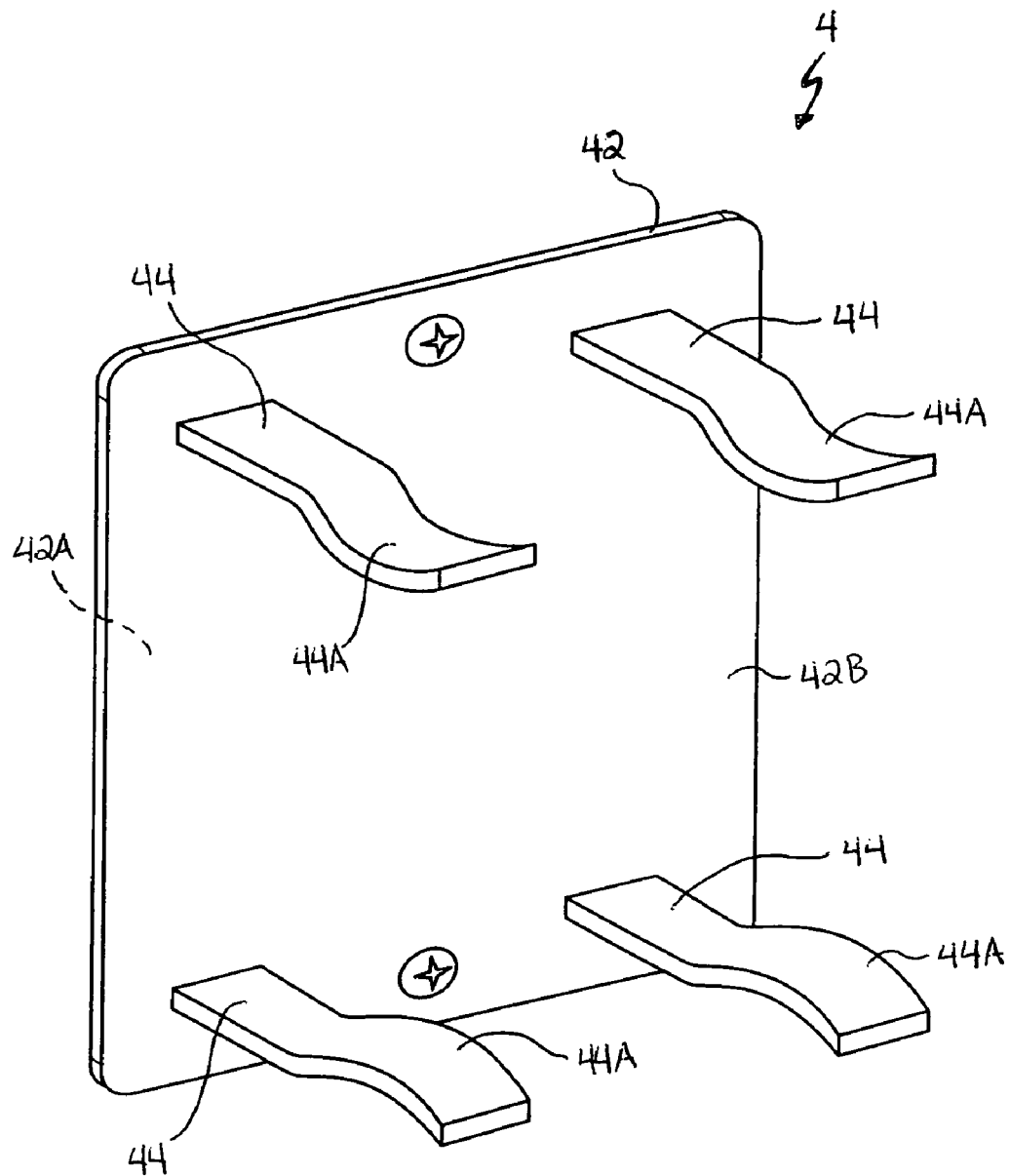
FIG. 4 is a perspective view of the spring clamp.

As shown in FIGS. 1 and 3, the housing clamp 4 is configured for removable engagement with the housing 2, thereby allowing the housing 2 to be stored and used in a readily accessible area, such as on a miter saw. As shown in FIG. 4, the clamp 4 is preferably a plate 42 having a generally planar rear surface 42A configured for engagement with a mounting surface (not shown), such as a surface on a miter saw, and a generally planar front surface 42B. Preferably, two sets of opposing spring fingers 44 are mounted on the front surface 42B and are configured for removably accepting the tape housing 2 therebetween, as shown in FIGS. 1 and 3. The spring fingers 44 are spaced apart at a distance approximating the height of the housing 2 so as to create a clamping engagement between the spring fingers 44 and the tape housing 2. In addition, the top wall 8 and bottom wall 10 of the housing 2 each has a pair of housing indents 46 positioned and configured for accepting a curved portion 44A of the spring fingers 44 when the tape housing 2 is engaged with the clamp 4. Thus, the housing 2 is able to be snapped into and compressively engaged with the clamp 4, thereby permitting unobstructed use of the housing 2 without risk of unintentional disengagement of the housing 2 from the housing clamp 4. It should be noted that the tape housing 2 may be mounted in the housing clamp 4 with the angled exterior surfaces 38A, 38B, and 38C facing upwardly or downwardly, as shown, so that the surfaces 28 of the coil tapes 18, may be viewed.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope to of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A reference apparatus comprising:
a tape housing holding therein, a tape coil selectively extendable, in part, from the tape housing and thereafter retractable into the tape housing, wherein a tape surface of the tape coil is imprinted with a reference chart, the reference chart having at least one column of input data items, and, in side-by-side relationship therewith, at least one column of output data items; the input and output data items related as a system of reference information visible when the tape coil is extended from the tape housing.

2. The reference apparatus of claim 1 wherein the input data items are corner angles between abutting building walls and the first column of output data items are miter angles for setting a saw blade angle for severing a molding strip.

3. The reference chart apparatus of claim 1 wherein the columns are arranged longitudinally on the tape surface.

4. The reference chart apparatus of claim 1 wherein the reference chart further has a second column of output data items arranged in side-by-side relationship with the first column of output data items in the system of reference information.

5. The reference chart apparatus of claim 4 wherein the second column of output data items are blade tilt angles of the saw blade for severing a crown molding strip.

6. The reference chart apparatus of claim 5 wherein the tape housing encloses a plurality of said tape coils, with each tape coil having two opposing surfaces, and each said surface imprinted with one said system of reference information corresponding with a selected crown molding slope angle.

7. The reference chart apparatus of claim 6 wherein each said tape coil has a terminal lip; wherein each said terminal lip displays the crown molding slope angles associated with the systems of reference information of the associated reference charts.

8. The reference chart apparatus of claim 6 wherein each of said tape surfaces has a visually distinct surface marking.

9. The reference chart apparatus of claim 7 wherein the tape housing has a plurality of angled exterior surfaces, each of the angled exterior surfaces forming an angle corresponding to a selected crown molding slope angle.

10. The reference chart apparatus of claim 8 wherein adjacent to each of the angled exterior surfaces, an exterior surface of the tape housing is imprinted, with the surface marking of a corresponding one of the tape surfaces.

11. The reference chart apparatus of claim 8 wherein adjacent to each of the terminal lips, an exterior surface of the tape housing is imprinted, with the surface marking of a corresponding one of the tape surfaces.

12. The reference chart apparatus of claim 1 further comprising a housing clamp having a plate, and extending outwardly from the plate are a pair of spaced apart spring fingers, the fingers positioned for applying clamping forces on the housing when the housing is positioned between the fingers.

13. The reference chart apparatus of claim 12 wherein the housing provides indents positioned for receiving the spring fingers.

* * * * *